Dec. 18, 1962     I. EIDLISZ     3,068,779
SEPARATOR FOR A COOKING UTENSIL
Filed May 25, 1959

ISAAK EIDLISZ
*INVENTOR.*

3,068,779
SEPARATOR FOR A COOKING UTENSIL
Isaak Eidlisz, 182 S. 3rd St., Brooklyn, N.Y.
Filed May 25, 1959, Ser. No. 815,651
1 Claim. (Cl. 99—416)

This invention relates to a separator for a cooking utensil for edible substances and more particularly to a separator adapted to segregate such substances from other contents of the vessel.

In the cooking of various edible substances, such as vegetables for example, it is often desirable to segregate the vegetables from the cooking fluids in order to prevent the dispersal of the vegetable substances in the fluid to permit the ready removal of such substances from the cooking vessel and for other reasons well known to those skilled in the culinary arts.

It is therefore an object of this invention to provide a separator for a cooking vessel, which separator is adapted to be introduced into said vessel and to segregate edible substances to be subjected to the cooking process.

It is another object of this invention to provide a separator adapted to be removably disposed within a cooking vessel wherein the substance to be processed is maintained in segregated condition during such cooking process.

It is an additional object of this invention to provide an arrangement of the character indicated whereby the contents of a cooking vessel may be arranged so that different types of foods or edible substances are segregated from each other while being simultaneously processed therein.

It is also an object of this invention to provide a device of the character indicated which may be readily and economically manufactured on a large scale and which may be readily disposed within a cooking vessel and removed therefrom for use and storage and for cleaning and maintaining it in a sanitary condition.

Other and further objects, benefits and advantages of this invention will become apparent from the description thereof contained in the annexed specification or will otherwise become obvious. It will be understood that the invention here disclosed may be employed for other purposes to which the structure and arrangement are adapted.

Figure 1:
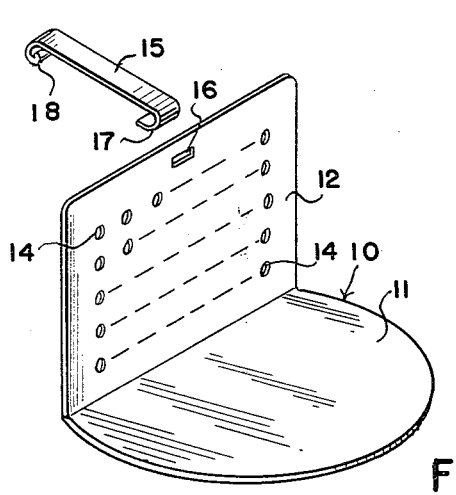
FIGURE 1 is an exploded perspective view showing a separator for a cooking vessel in accordance with my invention.
Figure 2:
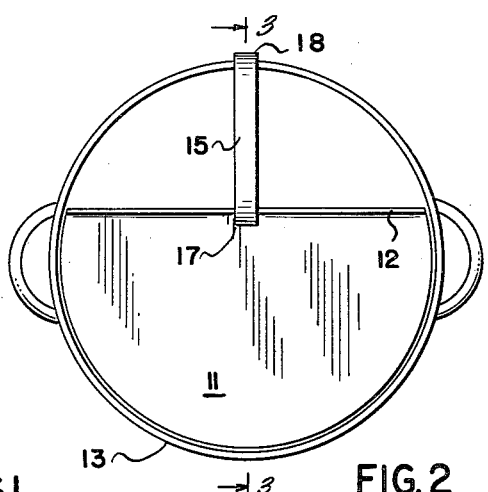
FIGURE 2 is a top plan view of a cooking vessel with a separator disposed therein in accordance with the present invention.
Figure 3:
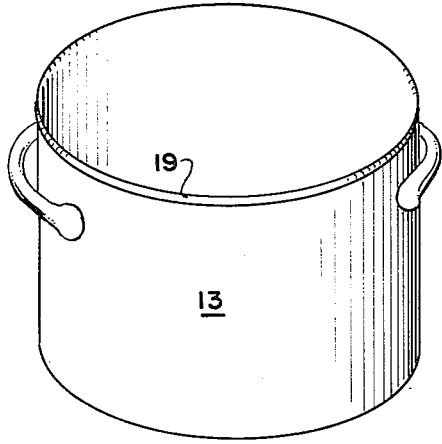
FIGURE 3 is a cross-section of FIGURE 2 taken along line 3—3 thereof.
Figure 3:
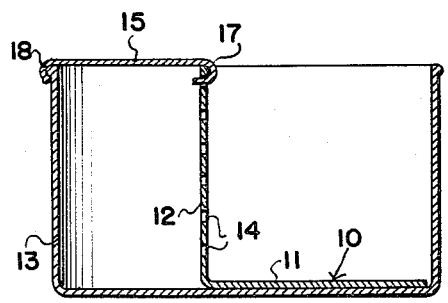

As shown in FIGURES 1, 2 and 3, the cooking vessel separator of the present invention is designated generally by the numeral 10 and is comprised of a horizontal base portion 11 and a vertically disposed partition portion 12. The base and partition are formed of a single sheet of metal, such as aluminum or stainless steel for example, which, after being blanked out, is bent so that the plane of the partition 12 is normal to the plane of the horizontal base 11. The base 11 in the form of the invention illustrated comprises a segment of a circular disc to conform to the configuration of the interior of a cylindrical pot 13. It will be understood, however, that the peripheral outline of the base portion 11 may differ in accordance with the configuration of the interior of the particular cooking vessel into which it is intended to be introduced. The partition wall portion 12 of the separator 10 is, as heretofore indicated, integrally formed with the base portion and is bent so as to extend normally with respect to said base and to be vertically disposed within the cooking vessel. The partition portion 12 is advantageously of rectangular configuration and the side edges thereof are adapted to be disposed in abutment with the side wall of the cooking vessel. The vertical partition 12 is further provided with a plurality of perforations 14 which permit communication between the two compartments which are formed in the cooking vessel when the separating device is disposed therein. Thus, although the cooking fluids are free to flow between the two compartments thus formed, the solid matter, such as vegetables, meats, etc., are nevertheless retained in segregated condition. As may be seen more clearly from FIGURES 2 and 3, the separating device is disposed within the cooking vessel by insertion therein so that the base portion of the separator 10 rests upon the bottom of the cooking vessel thereby accomplishing the separation of the vessel into two compartments. In some applications, it may be desired to clamp the separating device in position within the cooking vessel or to provide a reinforcement for the vertical wall portion thereof. A clamping bar 15 is provided for this purpose. The partition 12 is provided with an elongated slot 16 within which a hook-shaped portion 17 of the clamping bar 15 is removably received. The other end of the clamping bar is provided with an inwardly bent flange 18 which is adapted to engage the enlarged lip 19 usually formed around the rim of a cooking vessel. The clamping bar 15 is so dimensioned that when it is engaged within the slot of the partition, the flange 18 may be snapped over the rim 19 of the cooking vessel in order to retain the entire assembly in position. More specifically, the clamping bar would prevent the pivotal movement of the separator since hook 17 would be wedged in slot 16. The clamping bar is also useful in preventing flexure of the partition, particularly when employed in conjunction with a large size vessel.

Figure 4:
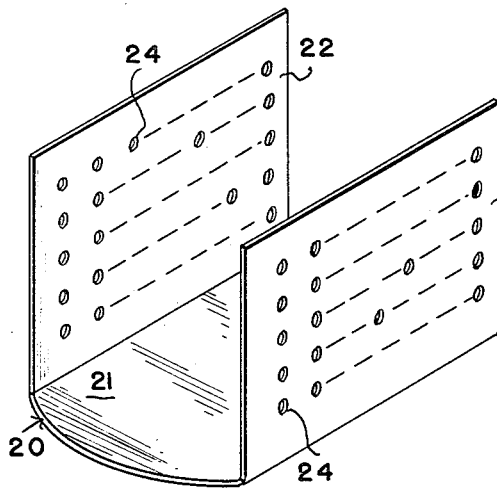
FIGURE 4 is a perspective view of a modified form of separator.

FIGURE 4 illustrates a modified form of separator whereby a cooking vessel may be divided into three instead of two compartments. This is accomplished by providing a generally U-shaped separating device designated generally by the numeral 20 which comprises the base portion 21 along the sides of which there extend vertical partition walls 22 and 23 which are each provided with perforations 24. It will be apparent that when the modified form of separator 20 is introduced into a cooking vessel, it will be divided into three compartments to permit the additional segregation of the contents of the cooking vessel.

It will be apparent from the foregoing that the separating device herein disclosed may be readily manufactured from a single blanked out sheet of metal or similar material by merely forming the right angle bends therein and that the device may be readily introduced or removed from a cooking vessel as required.

While I have here shown and described a preferred embodiment of my invention, it will be apparent however that this invention is not limited to this embodiment and that many changes, additions and modifications can be made in connection therewith without departing from the spirit and scope of the invention as herein disclosed and hereinafter claimed. Having described my invention what I claim as new and desire to secure by Letters Patent is:

In combination, a cooking vessel and a separating device adapted to be disposed within said cooking vessel for separating edible substances, said device having a removable fit in said vessel and comprising a substantially rectangular partition dimensioned so that the side walls thereof are disposed in abutment with the side wall of a cooking vessel when disposed therein, said partition being provided with a plurality of apertures therethrough, and an elongated slot adjacent the upper edge thereof, a base support for said partition, said base support comprising a planar element overlying more than half of the inner surface of the bottom wall of said vessel and conforming to the configuration of a portion of the interior of said vessel and extending substantially at right angles with respect to said vertical partition, a clamping bar for maintaining said separating device in fixed position within said vessel, said clamping bar comprising an elongated member, one end of said member being of hook-shaped conformation and being received in said slot and the other end of said bar being provided with an inwardly bent flange for engagement with the rim of a cooking vessel.

References Cited in the file of this patent

UNITED STATES PATENTS

| | | |
|---|---|---|
| 1,026,154 | Doughty | May 14, 1912 |
| 1,079,830 | Bohman | Nov. 25, 1913 |
| 1,630,787 | Cullen | May 31, 1927 |
| 2,158,236 | Haislip | May 16, 1939 |
| 2,459,561 | Yawman | Jan. 18, 1949 |

FOREIGN PATENTS

| | | |
|---|---|---|
| 10,029 | Great Britain | Dec. 3, 1914 |